United States Patent [19]
Ito

[11] 3,808,630
[45] May 7, 1974

[54] WINDSHIELD WIPER FOR VEHICLES

[76] Inventor: Isao Ito, 119 Kamezakitakanecho-8-chome, Handa-shi, Japan

[22] Filed: Sept. 26, 1972

[21] Appl. No.: 292,275

[30] Foreign Application Priority Data
Oct. 4, 1971 Japan................................ 46-91090

[52] U.S. Cl. .......................................... 15/250.42
[51] Int. Cl............................. B60s 1/04, B60s 1/40
[58] Field of Search..................... 15/250.42, 250.36

[56] References Cited
UNITED STATES PATENTS
3,029,460   4/1962   Hoyler............................ 15/250.42
3,733,643   5/1973   Arman............................ 15/250.42

Primary Examiner—Peter Feldman
Attorney, Agent, or Firm—Cushman, Darby & Cushman

[57] ABSTRACT

A windshield wiper for vehicles is provided in which a spring member elastically carrying a squeegee is longitudinally slidably retained by a pair of pawl or retaining members made of a synthetic resin and securely fixed to both ends of a second connecting or retaining member which in turn is pivoted to a first connecting member pivoted to a clip member fixed to an oscillating wiper arm. In operation no noise is produced because the second connecting members and the spring members which are made of a metal are separated from each other by the pair of synthetic resin pawl or retaining members, and in production the saving of the blank material from which a second connecting member is drawn may be realized because a flat blank having a uniform width may be used.

1 Claim, 6 Drawing Figures

PATENTED MAY 7 1974  3,808,630

WINDSHIELD WIPER FOR VEHICLES

BACKGROUND OF THE INVENTION

The present invention relates to generally a windshield wiper and more particularly an improvement of connecting or retaining members for longitudinally slidably retaining a spring member attached to a blade proper or squeegee.

In the prior art windshield wipers, the spring member attached to the squeegee is longitudinally slidably fitted into a pair of pawls formed at both ends of each of a pair of second connecting or retaining members which in turn are pivoted to a first connecting member pivoted to a clip member fixed to an oscillating wiper arm. In order to permit the smooth movement of the blade proper or squeegee over the curved windshield in good contact therewith, some space must be provided between the second connecting members or blade retaining members and the spring member attached to the blade proper or squeegee so that when the wiper arm is reversed in oscillation, the blade retaining members and the spring member collide against each other thus producing annoying noise. Furthermore the pawls or blade retainers must be formed at both ends of the second connecting member or blade retaining member so that the end portions of a blank from which the second connecting or blade retaining member is formed, must be wider than the portion between the ends. Therefore, the portions having a large area must be cut off from the blank so that the yield of the blank material is poor and the cost becomes very expensive.

SUMMARY OF THE INVENTION

The present invention was made to overcome the above and other defects encountered in the prior art windshield wipers.

Briefly stated, according to the present invention, unlike the prior art windshield wiper, the second connecting members or blade retaining members have no pawls for retaining the spring member attached to the blade proper or squeegee. Instead of the pawls of the prior art windshield wipers, the pawl members made of a synthetic resin are securely fixed to both ends of the second connecting member or blade retaining member so that the spring member attached to the blade proper or squeegee may be longitudinally slidably retained by the pawl members. Therefore unlike the prior art windshield wipers, no noise is produced by the collision of the metallic members. Furthermore the second connecting or blade retaining members may be economically formed from a blank having a uniform width throughout its length so that the yield of the blank materials may be improved and the cost may be reduced.

The present invention will become more apparent from the following description of one preferred embodiment thereof taken in conjunction with the accompanying drawing.

DESCRIPTION OF THE PREFERRED EMBODIMENT

Figure 1:
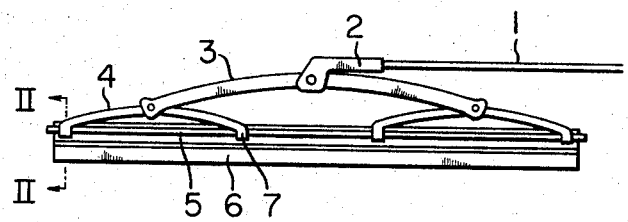
FIG. 1 is a front view of the prior art windshield wiper.
Figure 2:
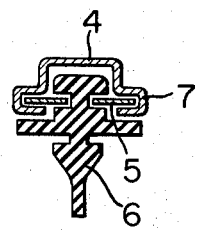
FIG. 2 is a sectional view on enlarged scale taken along the line II—II of FIG. 1.
Figure 3:
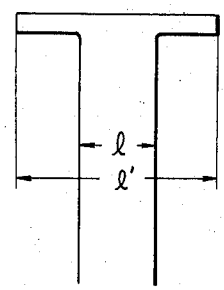
FIG. 3 is a top view illustrating a blank material from which is formed a second connecting or blade retaining member of the prior art windshield wiper.

Prior Art, FIGS. 1, 2 and 3

Prior to the description of one preferred embodiment of the present invention, the prior art windshield wiper will be described in brief in order to distinctly point out the defects thereof which the present invention contemplates to overcome. Referring to FIGS. 1 and 2, a clip member 2 fixed to a wiper arm 1 is pivotted a first connecting member 3 to which are pivotted a pair of second connecting members 4 whose ends are bent in the form of a pawl 7 in order to longitudinally slidably retain a spring member 5 attached to a blade proper or squeegee 6. Thus the pressure of the wiper arm 1 may be uniformly transmitted over the whole length of the blade proper or squeegee 6 in good contact with the windshield.

In general the second connecting members 4 and the spring member 5 are made of a metal, and the spring member 5 must be slidably fitted into the pawls 7 of the second connecting member 4 so that the wiper blade proper or squeegee 6 may effectively wipe the curved windshield. Therefore when the wiper arm 1 is reversed in oscillation the metallic members 4 and 5 collide against each other, producing the annoying noise which irritates the driver thus adversely affecting his safe driving. This noise problem could be overcome when the second connecting members 4 could be made of a synthetic resin, but in practice it is impossible to do so from the standpoint of mechanical strength. Furthermore blank materials having a wider width are required for forming the second connecting members 4 because the pawls 7 must be formed at both ends thereof. As shown in FIG. 3, a blank from which is formed the second connecting member 4 must have a width *l'* at both ends thereof greater than the width *l* of the base of a U-shaped connecting member 4. As a result, a large portion of the blank is wasted for nothing, resulting in the poor yield of the blank material and in the high cost.

Figure 4:
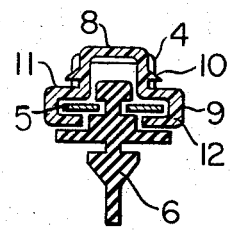
FIG. 4 is a sectional view of a windshield wiper in accordance with the present invention.
Figure 5:
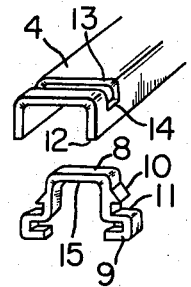
FIG. 5 is an exploded perspective view thereof.
Figure 6:
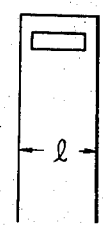
FIG. 6 is a top view of a blank from which is formed a second connecting member or blade retaining member of a windshield wiper of the present invention.

The Invention, FIGS. 4, 5 and 6

Referring now to FIGS. 4, 5 and 6, one preferred embodiment of the present invention will be described. Unlike the prior art windshield wiper, the second connecting members 4 have no pawl 7, and are made of an elongated metal blank with a uniform width *l* as shown in FIG. 6. As best shown in FIGS. 5 and 6 a pair of transverse slots 13 are formed at both ends of each of the second connecting members 4. A pawl member 8 which is made of a synthetic resin such as polyethylene comprises an inverted U-shaped portion 15 having outwardly tapered projections 10 and such a width as to permit the pawl member 8 to be smoothly fitted into the inverted U-shaped channel of the second connecting member 4, and a pair of pawls 9 for longitudinally slidably fitting therein the spring member 5 attached to the wiper blade proper or squeegee 6.

The assembly of the pawl member 8 with the second connecting member is very simple. First the inverted U-shaped portion 15 of the pawl member 8 is fitted into the inverted U-shaped channel of the second connecting member 4 and then into the slot 13 thereof. The tapered projections 10 of the pawl member 8 are elastically inwardly deformed as the pawl member 8 is fitted into the channel of the second connecting member, and when the tapered projections 10 pass beyond the lower ends 14 of the slot 13, they may return to their normal shape so that they may be securely engaged with the second connecting member 4 with the lower edges 12 of the second connecting member 4 securely abutting against the upper leg portions 11 of the pawls 9. Thus the pawl member 8 is securely joined to the second connecting member 4.

In the instant embodiment the pawl member 8 is joined to the second connecting member 4 with the tapered projections 10 in engagement with the lower side edges 14 of the transverse slot 13, but it will be understood that the pawl member 8 may be formed integrally with the second connecting member 4 when the latter is placed in a mold for forming the former.

As described hereinbefore, according to the present invention to the second connecting members are attached the plastic pawl members which in turn support the spring member attached to the windshield wiper proper or squeegee for longitudinal slidable movement. Therefore unlike the prior art windshield wipers, no noise is produced by the collision of the metallic members so that the driver is not annoyed or irritated by noise. Furthermore, it is not required to form the pawls or retaining members integrally with the second connecting members for retaining the spring member attached to the blade proper or squeegee so that the saving of the blank materials may be realized because the blank materials may have a narrow and uniform width. Therefore the improvement of the yield of the blank materials as well as the reduction in cost may be attained.

What is claimed is:

1. A windshield wiper for vehicles comprising
an oscillating arm,
an electric or vacuum-operated motor for oscillating said oscillating arm,
a clip member fixed to the free end of said oscillating arm,
a first connecting member pivoted at its intermediate to said clip member,
a pair of second connecting members pivoted at their intermediates to both ends of said first connecting member,
each of said pair of second connecting members being inverted U-shaped in cross section and provided with a pair of elongated transverse slots formed at both ends thereof,
a pair of pawl members made of a synthetic resin and securely fixed to said both ends of each of said pair of second connecting members for retaining a spring member attached to an elastic blade proper or squeegee,
said pawl member being substantially inverted U-shaped in cross section and having a pair of tapered projections formed at the leg portions thereof and adapted to engage with the lower side edges of said slots of said second connecting member,
said pawl member having a pair of U-shaped portions formed at both ends of said leg portion for fitting therein said spring member attached to said elastic blade proper or squeegee.

* * * * *